(12) United States Patent
Wang et al.

(10) Patent No.: US 9,642,492 B2
(45) Date of Patent: May 9, 2017

(54) GRIDDLE WITH ADJUSTABLE SPACE BETWEEN UPPER AND LOWER PANS

(75) Inventors: Hsin Tsung Wang, Tainan (TW); Chunyu Wu, Fujian (CN)

(73) Assignee: TSANN KUEN(CHINA) ENTERPRISE CO., LTD., Xiamen, Fujian (CN)

( * ) Notice: Subject to any disclaimer, the term of this patent is extended or adjusted under 35 U.S.C. 154(b) by 2363 days.

(21) Appl. No.: 12/601,906

(22) PCT Filed: Apr. 9, 2007

(86) PCT No.: PCT/CN2007/001135
§ 371 (c)(1),
(2), (4) Date: Nov. 25, 2009

(87) PCT Pub. No.: WO2007/115498
PCT Pub. Date: Oct. 18, 2007

(65) Prior Publication Data
US 2012/0090476 A1    Apr. 19, 2012

(30) Foreign Application Priority Data
Apr. 10, 2006  (CN) .......................... 2006 2 0082929

(51) Int. Cl.
*A47J 37/06*    (2006.01)

(52) U.S. Cl.
CPC .... *A47J 37/0611* (2013.01); *A47J 2037/0617* (2013.01)

(58) Field of Classification Search
CPC ...................... A47J 37/0611; A47J 2037/0617
See application file for complete search history.

(56) References Cited

U.S. PATENT DOCUMENTS

| 2,167,489 | A | * | 7/1939 | Renga | .................. | A47J 37/0611 16/357 |
| 2,784,663 | A | * | 3/1957 | Rand | .................... | A47J 37/0611 99/376 |
| 6,016,743 | A |   | 1/2000 | Glavan |  |  |

FOREIGN PATENT DOCUMENTS

| CN | 2528360 Y | 1/2003 |
| CN | 2605801 Y | 3/2004 |

(Continued)

OTHER PUBLICATIONS

Machine Translation of CN2750762 of Ying, the machine translation generated on Jun. 29, 2015 at translationportal.epo.org.*

*Primary Examiner* — David Angwin
*Assistant Examiner* — Amit K Singh
(74) *Attorney, Agent, or Firm* — Rabin & Berdo, P.C.

(57) ABSTRACT

Griddle with adjustable space between upper and lower pans, including an upper shell, a lower shell, rear sides of the upper and lower pans connected through adjustable hinges, the bottom of the upper hinge seat extending downwardly and the top of the lower hinge seat extending upwardly to form upper and lower joint arms, a groove extending along the side of the lower joint arm, the top of the groove extending forward, a protrusion mounted at the side of the lower joint arm and in front of the groove; the bottom of the upper joint arm extending to one side to form a pintle which can move in the groove, and a supporting portion formed at the bottom of the upper joint arm and in front of the pintle, to keep a space between the upper pan and the lower pan by abutting against the protrusion.

4 Claims, 3 Drawing Sheets

(56) References Cited

FOREIGN PATENT DOCUMENTS

| CN | 2645570 Y | 10/2004 |
|---|---|---|
| CN | 2666323 Y | 12/2004 |
| CN | 2750762 Y | 1/2006 |
| CN | 2873049 Y | 2/2007 |

\* cited by examiner

GRIDDLE WITH ADJUSTABLE SPACE BETWEEN UPPER AND LOWER PANS

FIELD OF THE INVENTION

The present invention relates to a griddle and, more particularly, to a griddle with adjustable space between upper and lower pans.

BACKGROUND OF THE INVENTION

With the improved living standard and higher working strength, more and more people like to go outing in spare time, the griddle has advantages such as portable, safe, environmentally friendly, thus it has become one of the preferred cooking appliances carried by people when go outing. Generally, a griddle comprises an upper pan and a lower pan which are hinged together in their rear sides, in use, the food is disposed between the two pans and then be heated by the two pans at the same time, thus the food is cooked. The disadvantage of the griddle is that it only suits for cooking thin piece food, if the food is thick or is bulk, then the front side of the upper pan will inclined upwardly, and an angle is formed between the upper and lower pans thus the two pans is not parallel, therefore, the rear portion of the food will be grabbed tightly and is easy to be burned, and the front portion will be clamped loosely and is not easy to be cooked.

To overcome this problem, a griddle with adjustable space between upper and lower pans has been provided in prior art, and the main structure and principle of this griddle is that: a U-shaped pan support is configured in the lower pan, the rear ends of the two side rods of the pan support pivotally connected with the two rear corners of the lower pan respectively, and a handle is formed in the front rod, the middle portions of the two sides of the upper pan pivotally connected to the inner sides of the middle portions of the two side rods of the U-shaped pan support, the upper pan can rotate about the axis which is along the two hinged joints relative to the pan support. When the U-shaped pan support is rotated, the distance between the upper and lower pans is varied accordingly, but the upper and lower pans still can be maintained in parallel by the upper pan rotating relative to the U-shaped pan support. However, this griddle still has the following disadvantages: firstly, if the space between the upper and lower pans increased, although the upper and lower pans still can be maintained in parallel, but the upper pan offset backwardly with respect to the lower pan, the more space between the two pans, the more offset distance, i.e. the upper and lower pans can not been aligned in vertical direction; secondly, the upper pan can swing relative to the pan support, thus in practice the upper and lower pans are not easy to be adjusted in a completely parallel position; thirdly, friable food cannot be cooked because the weight of the upper pan will crush the food.

The inventor has applied a invention, titled as "a griddle with liftable top cover", to China's State Intellectual Property Office, and the application number is CN200520125193. X, the griddle of the invention comprises an upper shell, a lower shell, an upper pan embedded on the bottom surface of the upper shell and a lower pan embedded on the top surface of the lower shell, the rear of the lower shell is equipped with a connecting block capable of upward and downward movement, the upper portion of the connecting block protruded to the upper of the lower shell and pivotally connected to the rear side of the upper pan, and the lower shell is also inwardly equipped with a lifting mechanism which connected to the connecting block and can drive the connecting block to move upwardly and downwardly. The space between the upper and lower pans can be adjusted by the lifting mechanism, however, the lifting mechanism has relatively complex structure and high manufacture cost and is easy to be broken down by the weight of the upper pan.

SUMMARY OF THE INVENTION

The primary object of the present invention is to provide a griddle with adjustable space between the upper and lower pans, thereby to obviate the disadvantages of the griddles of prior art such as: does not suit for cooking thick food, can not grill the food by single side and can not realize heat preservation for the food etc., and also to obviate the disadvantages of the griddles with adjustable space between the upper and lower pans of the prior art.

This and other objects of the present invention are achieved by providing: a griddle with adjustable space between the upper and lower pans, comprising an upper shell, a lower shell, an upper pan embedded on the bottom surface of said upper shell and a lower pan embedded on the top surface of said lower shell, the rear sides of the upper pan and lower pan are connected together through adjustable hinges, said adjustable hinge comprises an upper hinge seat and a lower hinge seat which are connected with said upper pan and said lower pan respectively, the bottom of said upper hinge seat extends downwardly to form an upper joint arm, and the top of said lower hinge seat extends upwardly to form a lower joint arm; a sliding groove is formed extending along vertical direction at the side of said lower joint arm, the top of said sliding groove extending forwardly to form a pivotal connecting groove, a position protrusion is mounted at the side of said lower joint arm and in the front of said pivotal connecting groove; the bottom of said upper joint arm extend to one side to form a pintle which can move in said sliding groove and said pivotal connecting groove, and a supporting portion is formed at the bottom of said upper joint arm and in the front of said pintle, which can keep a space between said upper pan and said lower pan by abutting against the position protrusion. When the pintle is in the lowest position of the sliding groove and the upper pan covered on the lower pan, the upper pan can joint to the lower pan to cook the thin food; when the pintle is in said pivotal connecting groove and the supporting portion of the bottom of the upper joint arm abuts against the position protrusion of the lower joint arm, the upper pan will keep a certain space to the lower pan and they are parallel to each other, then thick food can be cooked, or the food can be cooked by single side, or achieve heat preservation for the food.

Said adjustable hinge of the present invention has two groups, which mounted in the two sides of the rear sides of the upper and lower pans respectively, thereby to secure the upper pan to the lower pan stably.

Said upper hinge seat is fastened to the top edge of said upper pan by bolt, said lower hinge seat is fastened to the bottom edge of said lower pan by bolt.

By abovementioned description of the structure of the present invention, compared to prior art, the present invention has the following advantages: firstly, the upper pan can joint to the lower pan tightly or they can be keep in parallel in a certain distance, thus the griddle not only can proceed general cooking, but also can cook thick food, or cook food by single side, or heat preservation for the food; secondly, the distance between the upper pan and lower pan can be adjusted by the hinges, and the hinges are simple-structure, easy-operation, lower cost, durable and can stably support the upper pan.

DETAILED DESCRIPTION OF THE PREFERRED EMBODIMENT

The preferred embodiment of the present invention will be best understood by the following detailed description when read in conjunction with FIG. 1 to FIG. 5

Figure 1:
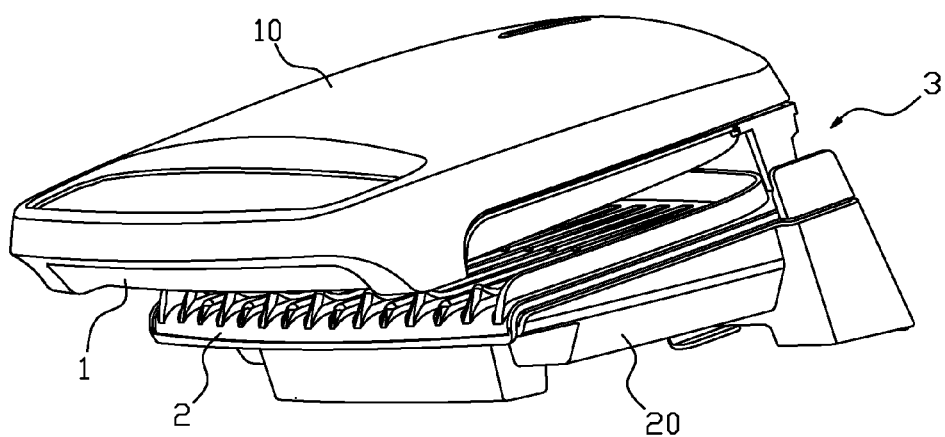
FIG. 1 is a perspective view of the griddle of the present invention, which shows the upper pan keeping a certain distance to the lower pan.

Referring to FIG. 1, a griddle with adjustable space between the upper and lower pans, comprising an upper shell 10, a lower shell 20 and an upper pan 1 embedded on the bottom surface of the upper shell 10 and a lower pan 2 embedded on the top surface of the lower shell 20, the two sides of the rear sides of the upper pan 1 and lower pan 2 are connected together through an adjustable hinge 3 respectively, only one adjustable hinge 3 is shown in FIG. 1, and the two adjustable hinge 3 are bilateral in structure.

Figure 2:
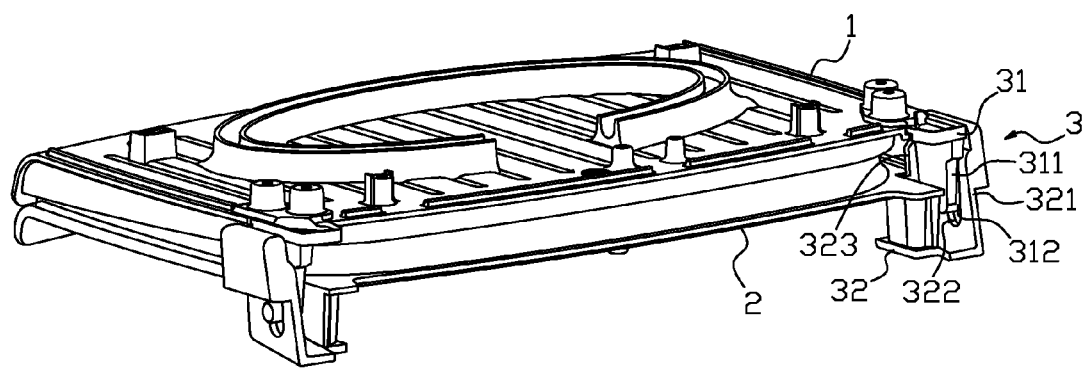
FIG. 2 is a perspective view of the griddle without the upper shell and lower shell, which shows the upper pan jointing tightly to the lower pan.
Figure 3:
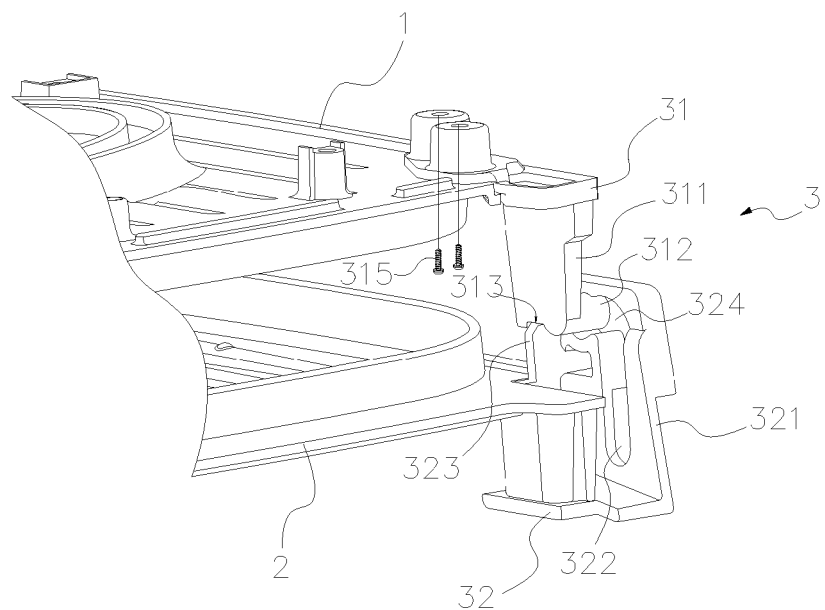
FIG. 3 is a perspective view of the adjustable hinge, which shows the hinge in an open position.
Figure 4:
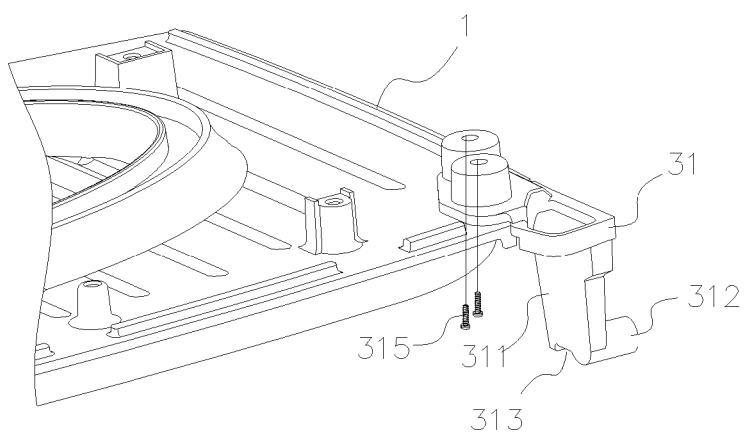
FIG. 4 is a perspective view of the upper portion of the adjustable hinge, which connected with the upper pan.
Figure 5:
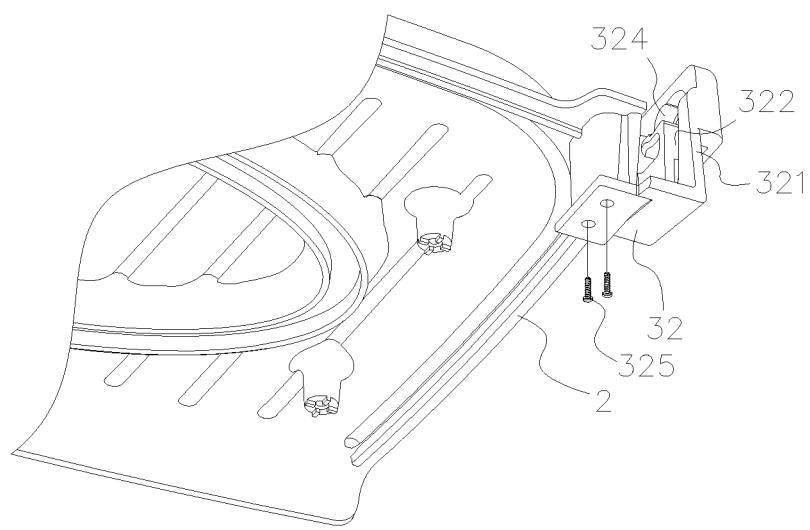
FIG. 5 is a perspective view of the lower portion of the adjustable hinge, which connected with the lower pan.

Referring to FIG. 2 and FIG. 3, the adjustable hinge 3 comprises an upper hinge seat 31 and a lower hinge seat 32 which are connected with the upper pan 1 and the lower pan 2 respectively, the bottom of the upper hinge seat 31 extends downwardly to form an upper joint arm 311, and the top of the lower hinge seat 32 extends upwardly to form a lower joint arm 321. The lower joint arm 321 is disposed outside the upper joint arm 311, i.e. according to the right and left hinges 3, the two upper joint arms 311 are inside the two lower joint arms 321. A sliding groove 322 is formed extending along vertical direction at the side of the lower joint arm 321, the top of said sliding groove 322 extending forwardly to form a pivotal connecting groove 324, a position protrusion 323 is mounted at the side of the lower joint arm 321 and in the front of said pivotal connecting groove 324; The bottom of said upper joint arm 311 extend to one side to form a pintle 312 which can move in said sliding groove 322 and pivotal connecting groove 324, and a supporting portion 313 is formed at the bottom of said upper joint arm 311 and in the front of said pintle 312, which can keep a space between said upper pan 1 and said lower pan 2 by abutting against the position protrusion 323. Referring to FIG. 4 and FIG. 5, the upper hinge seat 31 is fastened to the top edge of said upper pan 1 by bolt, said lower hinge seat 32 is fastened to the bottom edge of said lower pan 2 by bolt.

When the pintle 312 is in the lowest position of the sliding groove 322 and the upper pan 1 covered on the lower pan 2, the upper pan 1 can joint to the lower pan 2 to cook thin food; when the pintle 312 is in said pivotal connecting groove 324 and the supporting portion 313 of the bottom of the upper joint arm 311 abuts against the position protrusion 323 of the lower joint arm 321, the upper pan 1 will keep a certain space to the lower pan 2 and they are parallel to each other, then the thick food can be cooked, or cook the food with single side, or achieve heat preservation for the food.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the scope of the appended claims.

INDUSTRIAL APPLICABILITY

The griddle with adjustable space between the upper and lower pans of the present invention has at least two corresponding positions between the upper pan and the lower pan, it can be widely used, easily manufactured and industrialized.

What is claimed is:

1. A griddle comprising:
an upper pan including an upper hinge seat, said upper hinge seat extending perpendicularly to said upper pan to form an upper joint arm having a pintle and a supporting portion at a distal end, said pintle being parallel to said upper pan and opposite to said supporting portion; and
a lower pan including a lower hinge seat, said lower hinge seat extending perpendicularly to said upper pan to form a lower joint arm having a sliding groove defining a lower position and an upper position, and a position protrusion parallel to said lower joint arm;
wherein
said griddle transitions between a lowered state and a raised state,
said pintle is in said sliding groove at said lower position, and said upper pan contacts said lower pan, when said griddle is in said lowered state, and
said pintle is in said sliding groove at said upper position, said supporting portion of said upper joint arm abuts said position protrusion of said lower joint arm, said upper pan parallels said lower pan and defines a space between said upper pan and lower pan, when said griddle is in said raised state,
wherein said sliding groove further comprises a pivotal connecting groove at said upper position, and said position protrusion being in front of said pivotal connecting groove.

2. The griddle according to claim 1, further comprising:
an upper shell, said upper pan being embedded in said upper shell, and
a lower shell, said lower pan being embedded in said lower shell.

3. The griddle according to claim 1, wherein said pintle is in said pivotal connecting groove when said griddle is in said raised state.

4. The griddle according to claim 1, wherein said upper hinge seat is fastened to said upper pan; and said lower hinge seat is fastened to said lower pan.

\* \* \* \* \*